US009436882B2

(12) United States Patent
Dahl et al.

(10) Patent No.: US 9,436,882 B2
(45) Date of Patent: Sep. 6, 2016

(54) AUTOMATED REDACTION

(71) Applicant: Lighthouse Document Technologies, Inc., Seattle, WA (US)

(72) Inventors: Christopher Byron Dahl, Seattle, WA (US); Debora Noemi Motyka Jones, Seattle, WA (US); Kevin Patrick O'Neill, Seattle, WA (US); Geoffrey Alan David Belger, Seattle, WA (US); Vladas Walter Mazelis, Seattle, WA (US); Nathaniel Byington, Seatte, WA (US); Beau Hodges Holt, Seattle, WA (US); John Charles Olson, Seattle, WA (US)

(73) Assignee: Lighthouse Document Technologies, Inc., Seattle, WA (US)

( * ) Notice: Subject to any disclaimer, the term of this patent is extended or adjusted under 35 U.S.C. 154(b) by 189 days.

(21) Appl. No.: 14/020,524

(22) Filed: Sep. 6, 2013

(65) Prior Publication Data

US 2015/0071542 A1 Mar. 12, 2015

(51) Int. Cl.
*G06F 17/00* (2006.01)
*G06K 9/00* (2006.01)

(52) U.S. Cl.
CPC ....... *G06K 9/00852* (2013.01); *G06K 9/00442* (2013.01); *G06K 2009/00489* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 2007/0172124 A1* | 7/2007 | Withum et al. | 382/181 |
| 2009/0234826 A1* | 9/2009 | Bidlack | 707/5 |
| 2009/0323087 A1* | 12/2009 | Luo | 358/1.9 |
| 2014/0212040 A1* | 7/2014 | Walker et al. | 382/182 |

* cited by examiner

*Primary Examiner* — Keith Bloomquist
(74) *Attorney, Agent, or Firm* — Schwabe, Williamson & Wyatt, P.C.

(57) ABSTRACT

In embodiments, one or more computer-readable media may have instructions stored thereon which, when executed by a processor of a computing device provide the computing device with a redaction module. The redaction module may be configured to receive a request to redact a selection of text from a document and identify instances of the text occurring within the document through an analysis of word coordinate information of an image of the document. The redaction module may further be configured to generate redaction information, including redaction coordinates, the redaction coordinates may be based on the word coordinate information associated with respective instances of the text occurring within the document. The redactions, when applied to the image in accordance with the redaction coordinates, may redact the respective instances of the text. Other embodiments may be described and/or claimed.

31 Claims, 3 Drawing Sheets

AUTOMATED REDACTION

TECHNICAL FIELD

Embodiments of the present disclosure are related to the field of information processing and, in particular, to automated redaction of electronic documents.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

When documents are sought to be produced for an audience other than the originally intended audience for those documents, it may be necessary to limit the information contained in those documents to only necessary information. One method for limiting those documents to only necessary information is through redaction of the documents. Redaction of the documents may include obscuring, blocking out, or removal of text from a document prior to production of the document. Manual redaction may be time consuming and prone to errors, such as an accidental redaction of information, failing to redact information that should have been redacted, or inconsistent redactions between similar documents. In some instances, such as electronic discovery during litigation or government investigations, or sharing corporate information in mergers and acquisitions, the drawbacks for manual redaction may be compounded due to the massive number of documents that may need to be redacted and may require a great number of individuals to process such redactions.

DETAILED DESCRIPTION OF ILLUSTRATIVE EMBODIMENTS

Figure 1:
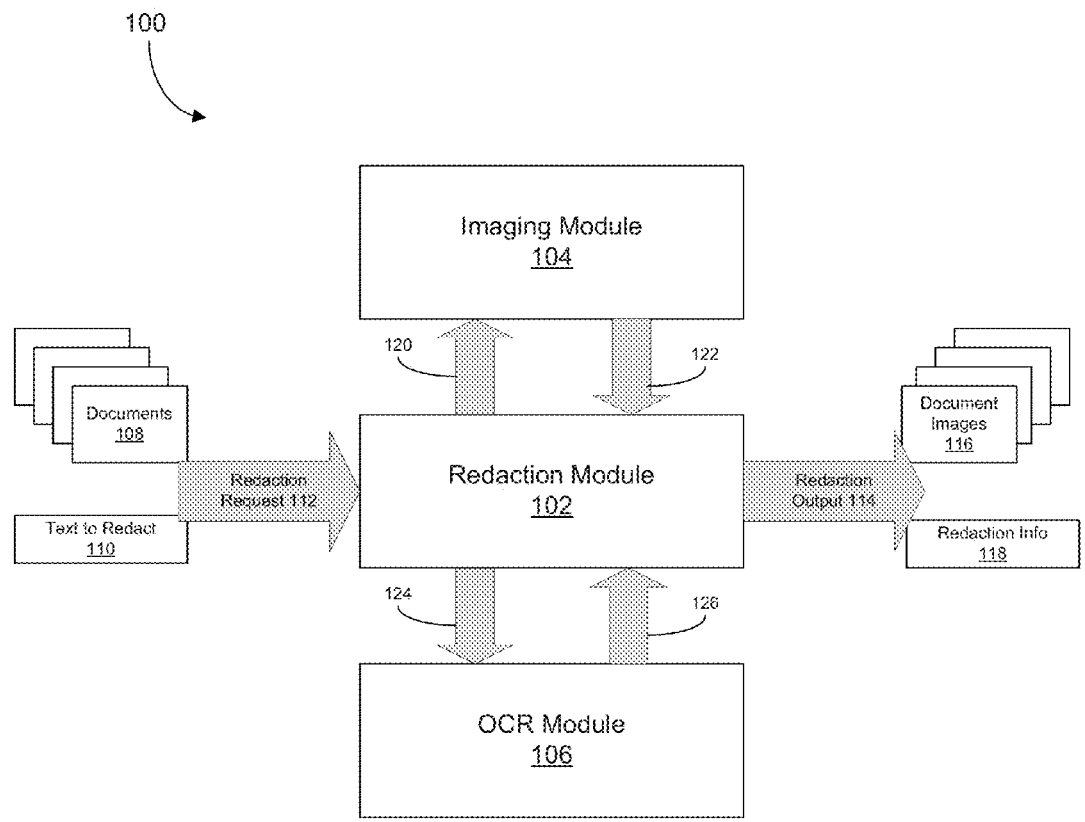
FIG. 1 depicts an illustrative redaction system according to some embodiments of the present disclosure.

A method, storage medium, and apparatus, for redaction of electronic documents and/or electronic images of documents are described herein. In embodiments, the storage medium may have instructions stored thereon which, when executed by a processor of a computing device, provide the computing device with a redaction module. In embodiments, the redaction module may be configured to receive a request to redact a selection of text from a document. The redaction module may be further configured to identify instances of the text occurring within the document through an analysis of word coordinate information of an image of the document. In embodiments, the word coordinate information may be generated by an optical character recognition (OCR) process performed on the image. The redaction module may, in some embodiments, be configured to generate redaction information, including redaction coordinates, the redaction coordinates may be based on the word coordinate information associated with respective instances of the text occurring within the document, wherein redactions applied to the image, in accordance with the redaction coordinates, redact the respective instances of the text.

In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, electronic document refers to any document in electronic form, including, but not limited to, images and/or word processing versions of documents. Images of documents may include those images created by scanning a hard copy of a document and/or images created by imaging a word processing version of a document.

FIG. 1 depicts an illustrative redaction system 100 according to some embodiments of the present disclosure. In embodiments, redaction system 100 may include redaction module 102, imaging module 104 and optical character recognition (OCR) module 106. Redaction module 102 may be configured to take as input redaction request 112. Redaction request 112 may include documents 108 and text to redact 110. In some embodiments, documents 108 may include copies of documents to be redacted, images of documents to be redacted, an electronic link to copies of documents or images of documents to be redacted, or any combination thereof. Text to redact 110 may contain text, such as a word, phrase, sentence, or paragraph to be redacted from documents 108. Text may be composed of any combination of characters including, but not limited to, alpha, numeric, and/or special characters.

In embodiments, redaction module 102 may be communicatively coupled with imaging module 104 and OCR module 106. The communicative coupling may be accomplished via any appropriate mechanism, including, but not limited to, a system bus, local area network (LAN), wide area network (WAN), and/or the Internet. A LAN or WAN may include one or more wired and/or wireless networks.

In some embodiments, redaction module 102 may be configured to send request 120 to imaging module 104 to have images of documents 108 created where an image of one or more of the individual documents, or a link to an image of the document, is not included in documents 108. In embodiments, imaging module 104 may be configured to take the document, or a link to the document, and convert the document to an image. The image may be any type of computer-readable image capable of having an OCR process performed on it. This disclosure is equally applicable regardless of the type of image produced by imaging module 104.

In some embodiments, request 120 may be on a document-by-document basis, wherein redaction module 102 is configured to send request 120 for each document contained in documents 108 to be imaged. In other embodiments, redaction module 102 may be configured to determine a group of documents needing an image created from documents 108 and may send the entire group to imaging module 104 to have corresponding images created. In such embodiments, the group may be determined by a predetermined number of documents to group together up to, and including, all documents to be imaged from documents 108. Furthermore, redaction module 102 may be configured to send request 120 synchronously or asynchronously and imaging module 104 may be configured to process the request correspondingly.

Once a document image corresponding with each document in request 120 has been created by imaging module 104, imaging module 104 may be configured to package the resultant document images, or links to the resultant document images, into response 122 and may send response 122 to redaction module 102. It will be appreciated that where documents 108 contains document images and/or links to document images for all documents contained within documents that no requests to imaging module 104 may be necessary. Furthermore, it will be appreciated that the creation of the images need not be requested by redaction module 102 and that, in some embodiments, any such imaging may occur prior to redaction module 102 receiving redaction request.

In some embodiments, in lieu of electronic documents 108, redaction module 102 may be provided with the document images as inputs directly. For these embodiments, the above interaction with imaging module 104 may be skipped. In embodiments, whether the input documents are electronic documents 108 or document images may be indicated in request 112, or automatically detected by redaction module 102, e.g., based at least in part on the file types of the files having electronic documents 108 or the document images.

Upon receiving response 122 (or the document images directly), redaction module 102 may be configured to send request 124 to OCR module 106 containing document images or links to document images for OCR module 106 to process. OCR module 106 may be configured to process each document image of request 124 by generating word coordinate information associated with each document image. In embodiments, word coordinate information may include information concerning a location of each word in the imaged document and a perimeter in the imaged document within which each word is contained. Word coordinate information is discussed in greater detail in reference to FIG. 2 below.

In some embodiments, redaction module 102 may be configured to send request 124 on an image-by-image basis, wherein request 124 is sent for each document image created by imaging module 104 and/or each document image available in documents 108. In other embodiments, redaction module 102 may be configured to determine a group of images to send to OCR module 106 to create corresponding images. In such embodiments, the group may be determined by a predetermined number of document images to group together up to, and including, all available document images. Furthermore, redaction module 102 may be configured to send request 124 synchronously or asynchronously and OCR module 106 may be configured to process the request correspondingly without departing from the scope of this disclosure.

In some embodiments, imaging module 104 may produce word coordinate information which may be utilized by redaction module 102. Imaging module 104 may be configured to produce the word coordinate information utilizing an internal OCR process and/or one or more print drivers configured to generate word coordinate information. In such embodiments, the OCR process may be superfluous and OCR module 106 may be omitted. In other embodiments, redaction module 102 may be provided with images and corresponding word coordinate information associated with the images in redaction request 112. In such instances both imaging module 104 and OCR module 106 may be omitted.

Upon receiving response 126, redaction module 102 may be configured to identify instances of text to redact 110 occurring in the word coordinate information generated by OCR module 106. Redaction module 102 may be further configured to determine redaction info 118 sufficient to fully redact the identified instances of text to redact 110. Redaction module 102 may be configured to output redaction output 114, including redaction info 118 and document images 116. Document images 116 may include all images processed by OCR module 106. In embodiments, when redaction info 118 is applied to document images 116, the identified instances of text to redact 110 may be fully redacted. In some embodiments, redaction request 112 may include text and/or a graphic to be overlayed on the identified instances of the text to be redacted, not pictured here.

In some embodiments, redaction module 102 may interact with one or more management applications, not pictured. Such a management application may generate redaction request 112 and may track the requests through the redaction process described herein. In embodiments, the management application may provide real-time status of the redaction request to a user of the management application. For example, the management application may be a third party application associated with a document review platform.

In some embodiments, to generate redaction request 112, the management application may be configured to allow a user of the management application to perform a search for text to redact within a database of documents to identify documents to include in documents 108 that may contain text to redact. In some embodiments, the search for text to redact may be performed by redaction module 102. In some embodiments, management application may be configured to utilize a regular expression to identify text to redact from the document as well as documents to include in documents 108 that may contain text to be redacted. For example, a user may wish to redact all social security numbers from a set of documents. To accomplish this, the user may define a regular expression that may identify instances of social security numbers and return the social security numbers as text to be redacted from the documents. This text to be redacted may then be submitted to redaction module 102, along with the associated documents for redaction. In some embodiments, redaction module 102 may be configured to accept the regular expression and perform the search to identify instances of text that match the pattern defined by the regular expression. Redaction module 102 may then return the identified instances of text to the management application to be used by the user or may return the identified instances of text to the user.

The documents identified in the search may be packaged together, along with the text to be redacted and submitted as redaction request 112. This may be beneficial to ensure only those documents containing the text to be redacted are submitted with redaction request 112. In some embodiments, the management application may be configured to record the number of occurrences of the text to be redacted in the individual documents and may include this information in the redaction request on a document by document basis or a total number of occurrences in the request. In some embodiments, this number of occurrences may be utilized during the processing of the redaction request to determine when all instances of the text to be redacted have been found, either on a document by document basis or on a request by request basis. The number of occurrences may also be utilized by a user of the management application to compare the number of occurrences of the text that were actually redacted by the redaction module against the possible number of occurrences to determine the efficiency of the redaction module and determine the number of occurrences that were missed and still need to be redacted, again, this may be on a document by document basis or a request by request basis.

In some embodiments, redaction module may be configured to take in a document having a redaction and copy, or mimic, that redaction onto other pages of that document and/or other documents. For example, consider a spreadsheet where only a few pages need to be produced. In such an instance, a redaction may be applied to single page in the spreadsheet which may redact the entire page. A user may then submit a request to redaction module 102 to have the redaction applied to designated pages that need not be produced. Redaction module 102 may be able to merely copy the redaction over to the designated pages for the document to be produced.

Figure 2:
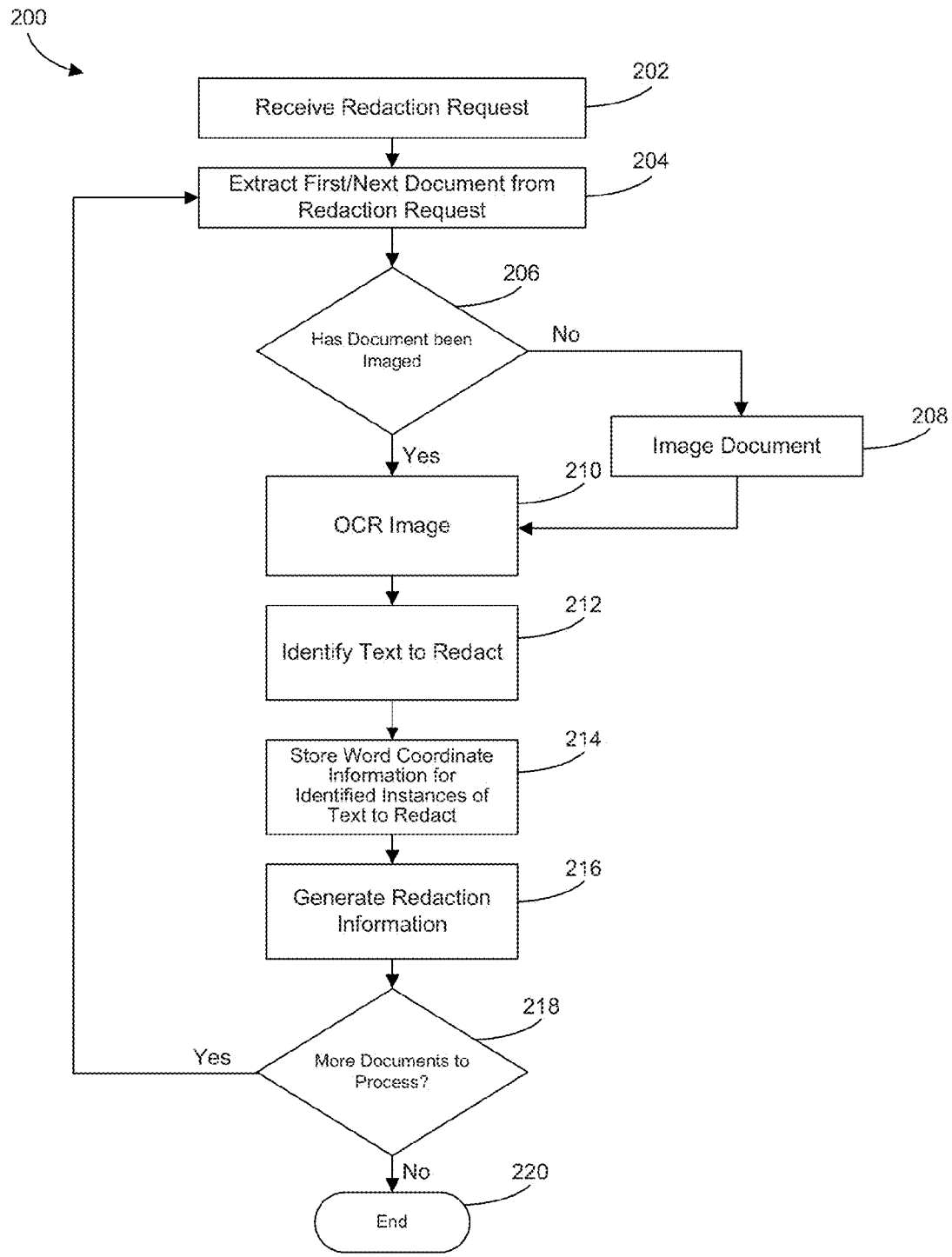
FIG. 2 depicts an illustrative process flow of a redaction process according to some embodiments of the present disclosure.

FIG. 2 depicts an illustrative process flow of a redaction process 200 according to some embodiments of the present disclosure. The process may begin at block 202 where a redaction request is received, such as, for example, redaction request 112 of FIG. 1. In block 204 a document may be extracted from the request, e.g., by redaction module 102. The document may be a first document contained within the request or it may be a subsequent document depending on the stage of processing the redaction request. In embodiments, the document may be extracted merely by opening the document via a copy of the document, or link to the document, provided with the request. In other embodiments, the documents in the request may be encrypted for increased security and to extract the documents may further involve decryption of the documents.

In block 206 a determination is made as to whether the current document has been imaged, e.g., by redaction module 102. In some embodiments, the document itself may be an image in which case this determination may be resolved in the affirmative. In other embodiments, the document may have an image associated with it indicating that the document has already been imaged, such as, for example, via an electronic link contained in metadata of the document and/or the request. If the document has an image associated with it, the image of the document may be retrieved for processing.

Where the document has been imaged, processing can proceed to block 210. Where the document has not been imaged, processing may proceed to block 208. At block 208 an image of the document may be created. This may be accomplished by converting the document into any type of computer-readable image capable of having an OCR process performed on it, such as, for example, a tagged image file format (TIFF), a joint photographic experts group (JPEG) format, a graphics interchange format (GIF), etc. This disclosure is equally applicable regardless of the type of image produced in block 208. Once the document is imaged, processing may return to block 210.

In block 210 an optical character recognition (OCR) process is performed on the image of the document, e.g., by OCR module 106. The OCR process may generate word coordinate information associated with the image. The word coordinate information may contain the words extracted from the image by the OCR process, as well as the coordinate information associated with each word. The coordinate information associated with each word may identify a location of the word in the image as well as a width and height of the word. For example, the associated coordinate information may indicate a single x and y coordinate, along with an indication of width and height for the word such that, when taken in combination, it may be possible to form a perimeter around the word. In another example, the associated coordinate information may be represented by two x coordinates and two y coordinates, which, when taken in combination may also form a perimeter around the word. It will be appreciated that the above examples are meant to merely be illustrative of possible word coordinate information and that any format of word coordinate information capable of conveying a perimeter within which a word is contained is anticipated by this disclosure.

Once the image has had an OCR process performed on it, process 200 may proceed to block 212 where the text to redact is identified in the word coordinate information generated by the OCR process, e.g., by redaction module 102. In embodiments, this may involve a multi-pronged approach. A first prong may be to search the word coordinate information for instances of the exact text included in the redaction request. Another prong may be to utilize a Levenshtein distance algorithm to determine possible instances of the text to be redacted in the word coordinate information. A third prong may take into account characters that are commonly misinterpreted during the OCR process to determine possible instances of the text to be redacted.

The first prong may be accomplished by searching the word coordinate information for an exact match for the text to redact. This may be accomplished by utilizing any type of pattern matching algorithm. For instance, the search may begin by searching for a match for the first portion of the text. As an example, if the text is a phrase, the search may begin by searching the word coordinate information for the first word in the phrase. If the first word in the phrase is found, then the next word in the phrase may be compared against the next word in the word coordinate information. If one of the words in the word coordinate information does not match the corresponding word in the phrase then the search begins again searching for the first word in the phrase from the current point in the word coordinate information. This comparison may continue until all instances of the phrase to be redacted are found.

The second prong may begin in a similar manner to the first prong, by searching the word coordinate information for the text to redact. Again this may be accomplished by utilizing any pattern matching algorithm; however, instead of searching for exact matches for the text, the Levenshtein distance algorithm may be utilized to find text within a predetermined Levenshtein distance value from the text to be matched. The Levenshtein distance value may be considered the number of characters that need to be changed in one word to convert that word into another word. For example, the words "cat" and "hat" would each have a Levenshtein distance value of 1 from one another because in either case only a single letter needs to be changed to convert either word into the other.

By utilizing the Levenshtein distance algorithm it is possible to identify words that are within a predetermined error rate from the word being searched. For instance, if it is known that the OCR process being used has a certain error rate, that error rate may be able to be accounted for utilizing the Levenshtein distance algorithm. In other instances, the predetermined error rate may indicate an acceptable level of error for the given process. In some embodiments an acceptable Levenshtein distance value may be determined based on the total number of letters in the word or text to be matched. For example, the longer the word being analyzed, the greater the allowable Levenshtein distance value may be.

Utilizing the Levenshtein distance value, the process may again be performed based on a word-by-word analysis similar to that described in reference to the first prong. If the first word in the phrase is found within an acceptable Levenshtein distance value then the next word in the phrase may be compared to the next word in the word coordinate information. If one of the words in the word coordinate information does not match the corresponding word in the phrase within the acceptable Levenshtein distance value then the search begins again searching for the first word in the phrase from the current point in the word coordinate information. This comparison may continue until all instances of the phrase to be redacted are found.

The third prong may begin in a similar manner to the first and second prongs, by searching for the text to redact in the word coordinate information. Again this may be accomplished by utilizing any pattern matching algorithm; however, instead of searching for exact matches for the text, characters commonly misinterpreted by an OCR process may be ignored to find a match between the text to be redacted and the word coordinate information. As an example, consider the word "illegal," the "i" and the three l's may be commonly misinterpreted characters for an OCR process. As a result, in the word coordinate information, the word may be represented as "!||ega1." When searching for exact matches, this representation of the word illegal would be completely missed. However, if the commonly misinterpreted characters are ignored, the remaining letters of the word match exactly. Furthermore, prong two may have also missed this representation because the Levenshtein distance value would be four for a word with only seven characters, which would represent a greater than 50% error rate.

In some embodiments, the second and third prong may be combined. In such embodiments, a word within a first Levenshtein distance value of a word to be matched may be considered a possible match. Then the commonly misinterpreted characters may be applied to those letters in the word that do not match the corresponding letters to be matched and, for every commonly misinterpreted character in the word, the Levenshtein distance value may be reduced accordingly. If, after the commonly misinterpreted characters are considered, the Levenshtein distance value has been reduced to within an allowable threshold, then the word may be identified as the word to be matched. As a result, returning to the above example using "illegal" as the word to be matched, the word "!||ega!" may have a Levenshtein distance value of four; however, when the commonly misinterpreted characters are considered, the Levenshtein distance value drops to zero, thus establishing a match for the word.

While the above discussion has generally discussed word by word comparisons to identify text to redact, this is merely for illustrative purposes and this disclosure should not be so limited. It will be appreciated that any other comparison methods may be utilized including anything from single character comparisons to comparing the entire text to be matched. Once one or more instances of text to redact have been identified, the word coordinate information associated with the specific occurrences may be stored to a repository, such as a table or database at block 214. In some embodiments, the redaction information may be generated contemporaneously with the identification of the text to redact. In such embodiments, it may be unnecessary to store the word coordinate information for the identified instances of the text to redact and block 214 may be omitted.

After all occurrences of the text to be redacted have been identified and stored, the redaction information may be generated at block 216. The redaction information may include coordinates of redaction boxes sufficient to cover the identified instances of the text to redact. In embodiments, the redaction information may be generated on a line-by-line basis by analyzing the word coordinate information associated with each instance of the text to redact and determining the words that are within a predetermined vertical variation from one another. For example, if the words are within a certain number of vertical pixels of each other then it may be determined that the words are on the same line. Once all of the words on the same line have been identified, the highest and lowest y-coordinates associated with the words on the current line may be determined to ensure the redaction covers the entire vertical component of the characters on that line. Then the left-most and right-most x coordinates associated with the words on the current line may be determined which may ensure that the redaction covers the entire horizontal component of the characters on that line. In embodiments, this may include punctuation and/or white space contained within the text to be redacted. From these four coordinates a redaction box may be formed that may cover the entirety of the current line. In some embodiments, additional padding may be added by expanding the x and y coordinates by a predetermined number of pixels to ensure the entirety of the text has been redacted. This process may be repeated for each line until all instances of the text to be redacted have associated redaction information.

In block 218 a determination may be made as to whether there are more documents to process in the redaction request, e.g., by redaction module 102. If there are more documents to be processed the process may return to block 204 where the next document may be extracted and the process above may be repeated on the newly extracted document.

In embodiments, process 200 may be implemented in hardware and/or software. In hardware embodiments, process 200 may be implemented in application specific integrated circuits (ASIC), or programmable circuits, such as Field Programmable Gate Arrays, programmed with logic to practice process 200. In a hardware/software implementation, process 200 may be implemented with software modules configured to be operated by the underlying processor. The software modules may be implemented in the native instructions of the underlying processor(s), or in higher level languages with compiler support to compile the high level instructions into the native instructions of the underlying processor(s). In various software implementations, the various prongs of processing described above may be implemented in multiple parallel execution threads.

Figure 3:
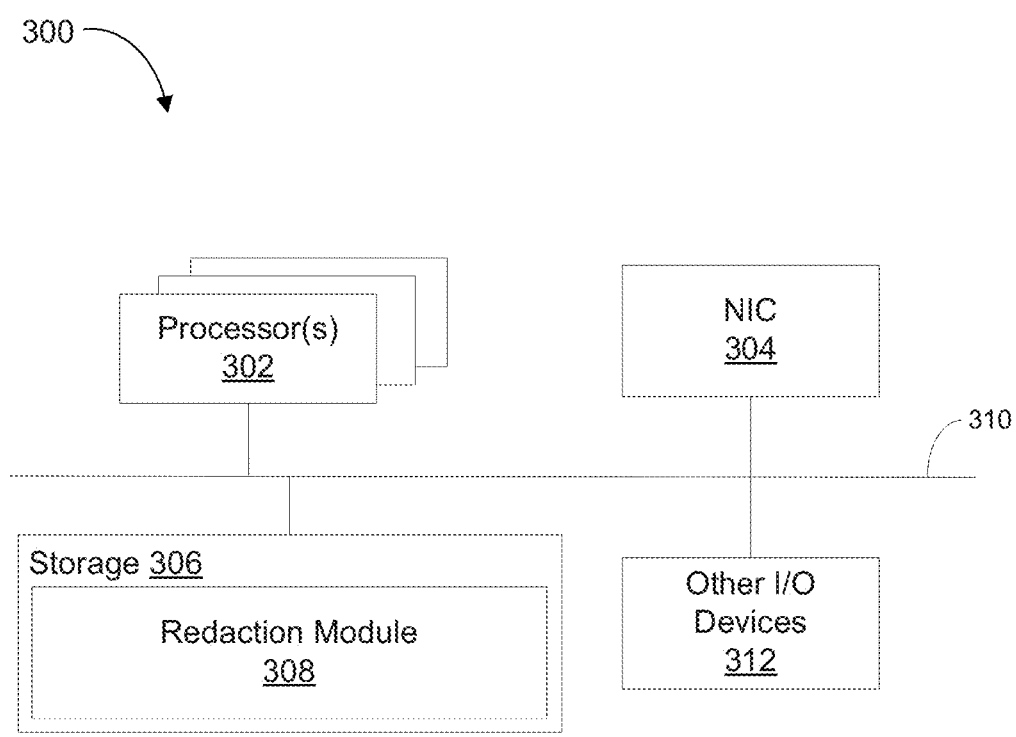
FIG. 3 depicts an illustrative hardware representation of a computing device in which some embodiments of the present disclosure may be implemented.

FIG. 3 depicts an illustrative configuration of a computing device 300 incorporated with the teachings of the present disclosure according to some embodiments. Computing device 300 may comprise processor(s) 302, network interface card (NIC) 304, storage 306, containing redaction module 308, and other I/O devices 312. Processor(s) 302, NIC 304, storage 306, and other I/O devices 312 may all be coupled together utilizing system bus 310.

Processor(s) 302 may be comprised of one or more single core and/or one or more multi-core processors, or any combination thereof. In embodiments with multiple processors the processors may be of the same type, e.g., homogeneous, or they may be of differing types, e.g., heterogeneous. This disclosure is equally applicable regardless of type and/or number of processors.

In embodiments, NIC 304 may be used by computing device 300 to access a network. In embodiments, NIC 304 may be used to access a wired and/or wireless network; this disclosure is equally applicable. NIC 304 may also be referred to herein as a network adapter, LAN adapter, or wireless NIC which may be considered synonymous for purposes of this disclosure, unless the context clearly indicates otherwise; and thus, the terms may be used interchangeably. In embodiments, NIC 304 may be configured to receive the redaction request, discussed above in reference to block 202 of FIG. 2, from a remote computer and may forward the request to redaction module 308 by way of system bus 310.

In embodiments, storage 306 may be any type of computer-readable storage medium or any combination of differing types of computer-readable storage media. Storage 306 may include volatile and non-volatile/persistent storage. Volatile storage may include e.g., dynamic random access memory (DRAM). Non-volatile/persistent storage 306 may include, but is not limited to, a solid state drive (SSD), a magnetic or optical disk hard drive, flash memory, or any multiple or combination thereof.

In embodiments redaction module 308, endowed with the logic to perform one or more operations earlier described with references to FIGS. 1 & 2, may be implemented as software, firmware, or any combination thereof. In various software embodiments, redaction module 308 may comprise one or more instructions that, when executed by processor(s) 302, cause computing device 300 to perform the one or more operations earlier described with references to FIGS. 1 & 2.

For the purposes of this description, a computer-usable or computer-readable medium can be any medium that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Embodiments of the disclosure can take the form of an entirely hardware embodiment, an entirely software embodiment or an embodiment containing both hardware and software elements. In various embodiments, software, may include, but is not limited to, firmware, resident software, microcode, and the like. Furthermore, the disclosure can take the form of a computer program product accessible from a computer-usable or computer-readable medium providing program code for use by or in connection with a computer or any instruction execution system.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

What is claimed is:

1. One or more non-transitory computer-readable media having instructions stored thereon which, when executed by a processor of a computing device, provide the computing device with a redaction module to:
   receive a request to redact a selection of a group of text from a document, wherein the group of text comprises one or more words;
   identify instances of the group of text occurring within the document, including for each instance of the group of text, word coordinate information of the one or more words of the instance, wherein the word coordinate information of the one or more words of the instance includes (x, y) coordinates of the one or more words; and
   generate redaction information for a redaction mask, including redaction coordinates, for each instance of the group of text, wherein the redaction coordinates of each redaction mask include (x, y) coordinates of the redaction mask, wherein generation of the (x, y) coordinates of a redaction mask is based at least in part on the (x, y) coordinates of the one or more words of the instance of the group of text to be redacted, wherein application of the redaction masks in accordance with the redaction coordinates of the redaction masks redacts the respective instances of the group of text, wherein a y-height of the mask is substantially equal to a height of a tallest letter within the respective instances of the group of text, wherein the height of the tallest letter is greater than heights of at least some of other letters within the respective instances of the group of text.

2. The one or more non-transitory computer-readable media of claim 1, wherein the group of text comprises a line of text.

3. The one or more non-transitory computer-readable media of claim 1, wherein application of the redaction masks in accordance with the redaction coordinates of the redaction masks redacts whitespace and punctuation occurring within the respective instances of the text.

4. The one or more non-transitory computer-readable media of claim 1, wherein the redaction module is to further identify groups of words within the document as instances of the text from the document by computation of respective Levenshtein distance values between the groups of words and the text, and a determination of whether each Levenshtein distance value is within a determined threshold.

5. The one or more non-transitory computer-readable media of claim 4, wherein the determined threshold is based upon a number of characters contained within the text.

6. The one or more non-transitory computer-readable media of claim 4, wherein computation and determination further comprise reduction of the Levenshtein distance value between a group of words and the text, on detection that the Levenshtein distance value between the group of words and the text is within a first threshold, wherein reduction of the Levenshtein distance between a group of words and the text is based on a correlation of characters that contribute to the Levenshtein distance value with one or more characters commonly misinterpreted by an optical character recognition, OCR process; and wherein determination further comprises identification of the group of words as an instance of the text when the reduced Levenshtein distance value is within a second threshold.

7. The one or more non-transitory computer-readable media of claim 6, wherein the first and second thresholds are based on a number of characters contained within the text.

8. The one or more non-transitory computer-readable media of claim 1, wherein to receive further comprises receipt of the selected group of text and the document.

9. The one or more non-transitory computer-readable media of claim 8, wherein the redaction module is to further generate an image of the document to be redacted when the request includes copies of the document to be redacted.

10. The one or more non-transitory computer-readable media of claim 9, wherein the word coordinate information is generated by an optical character recognition (OCR) process performed on the image of the document.

11. The one or more non-transitory computer-readable media of claim 1, wherein generation of the (x, y) coordinates of a redaction mask based at least in part on the (x, y) coordinates of the one or more words of the instance of the group of text to be redacted comprises selection of the y-coordinates of the redaction mask based at least in part on highest and lowest y-coordinates of the one or more words of the instance of the group of text to be redacted, and selection of the x-coordinates of the redaction mask based at least in part on leftmost and rightmost x-coordinates of the one or more words of the instance of the group of text to be redacted.

12. A system for redacting documents, comprising:
    a processor; and
    a redaction module to be operated by the processor to:
        receive a request to redact a selection of a group of text from a document, wherein the group of text comprises one or more words;
        identify instances of the group of text occurring within the document, including for each instance of the group of text, word coordinate information of the one or more words of the instance, wherein the word coordinate information of the one or more words of the instance includes (x, y) coordinates of the one or more words; and
        generate redaction information for a redaction mask, including redaction coordinates, for each instance of the group of text, wherein the redaction coordinates of each redaction mask include (x, y) coordinates of the redaction mask, wherein generation of the (x, y) coordinates of a redaction mask is based at least in part on the (x, y) coordinates of the one or more words of the instance of the group of text to be redacted, wherein to apply the redaction masks in accordance with the redaction coordinates of the redaction mask redacts the respective instances of the group of text, wherein a y-height of the mask is substantially equal to a height of a tallest letter within the respective instances of the group of text, wherein the height of the tallest letter is greater than heights of at least some of other letters within the respective instances of the group of text.

13. The system of claim 12, wherein the group of text comprises a line of text.

14. The system of claim 12, wherein the redaction masks applied to an image in accordance with the redaction coordinates redact whitespace and punctuation occurring within the respective instances of the text.

15. The system of claim 12, wherein the redaction module is to further identify groups of words within the document as instances of the text from the document by computation of respective Levenshtein distance values between the groups of words and the text, and a determination of whether each Levenshtein distance value is within a determined threshold.

16. The system of claim 15, wherein the determined threshold is based upon a number of characters contained within the text.

17. The system of claim 15, wherein computation and determination further comprises reduction of the Levenshtein distance value between a group of words and the text, on detection that the Levenshtein distance value between the group of words and the text is within a first threshold, wherein reduction of the Levenshtein distance between a group of words and the text is based on a correlation of characters that contribute to the Levenshtein distance value with one or more characters commonly misinterpreted by an OCR process; and wherein determination further comprises identification of the group of words as an instance of the text when the reduced Levenshtein distance value is within a second threshold.

18. The system of claim 17, wherein the first and second thresholds are based on a number of characters contained within the text.

19. The system of claim 12, wherein to receive further comprises receipt of the selected text and the document.

20. The system of claim 19, wherein the redaction module is to further generate an image of the document to be redacted when the request includes copies of the document to be redacted.

21. The system of claim 12, wherein the word coordinate information is generated by an optical character recognition (OCR) process performed on an image.

22. A computer-implemented method for redacting documents, comprising:
    receiving, by a redaction module of a computing device, a request to redact a selection of a group of text from a document, wherein the group of text comprises one or more words;
    identifying, by the redaction module, instances of the group of text occurring within the document, including for each instance of the group of text, word coordinate information of the one or more words of the instance, wherein the word coordinate information of the one or more words of the instance includes (x, y) coordinates of the one or more words; and
    generating, by the redaction module, redaction information for a redaction mask, including redaction coordinates, for each instance of the group of text, wherein the redaction coordinates of each redaction mask include (x, y) coordinates of the redaction mask, wherein generating the (x, y) coordinates of the redaction mask is based at least in part on the (x, y) coordinates of the one or more words of the instance of the group of text to be redacted, wherein applying the redaction masks, in accordance with the redaction coordinates of the redaction masks, redacts the respective instances of the group of text, wherein a y-height of the mask is substantially equal to a height of a tallest letter within the respective instances of the group of text, wherein the height of the tallest letter is greater than heights of at least some of other letters within the respective instances of the group of text.

23. The computer-implemented method of claim 22, wherein the group of text comprises a line of text.

24. The computer-implemented method of claim 22, wherein applying the redaction masks in accordance with the redaction coordinates of the redaction masks redacts whitespace and punctuation occurring within the respective instances of the group of text.

25. The computer-implemented method of claim 22, further comprising identifying groups of words within the document as instances of the text in the document, by the redaction module, by computing respective Levenshtein distance values between the groups of words and the text, and determining whether each Levenshtein distance value is within a determined threshold.

26. The computer-implemented method of claim 25, wherein the determined threshold is based upon a number of characters contained within the text.

27. The computer-implemented method of claim 25, wherein computing and determining further comprises:
reducing the Levenshtein distance value between a group of words and the text, on detecting the Levenshtein distance value between the group of words and the text is within a first threshold wherein reducing the Levenshtein distance between a group of words and the text is based on a correlation of characters contributing to the Levenshtein distance value with one or more characters commonly misinterpreted by an optical character recognition, OCR, process; and
wherein determining further comprises identifying the group of words as an instance of the group of text when the reduced Levenshtein distance value is within a second threshold.

28. The computer-implemented method of claim 27, wherein the first and second thresholds are based on a number of characters contained within the text.

29. The computer-implemented method of claim 22, wherein receiving comprises receive the selected group of text and the document.

30. The computer-implemented method of claim 29, further comprising generating an image of the document to be redacted when the request includes copies of the document to be redacted.

31. The computer implemented method of claim 22, wherein the word coordinate information is generated by an optical character recognition (OCR) process performed on the image.

* * * * *